(12) United States Patent
Elswick et al.

(10) Patent No.: US 12,176,821 B2
(45) Date of Patent: Dec. 24, 2024

(54) INTELLIGENT RECTIFIER CURRENT REGULATION OF DC BUS VOLTAGE DROOP

(71) Applicant: VERTIV CORPORATION, Columbus, OH (US)

(72) Inventors: Matthew Elswick, Delaware, OH (US); Xian Chen, Columbus, OH (US); Kaiyu Wang, Rochester Hills, MI (US)

(73) Assignee: VERTIV CORPORATION, Westerville, OH (US)

( * ) Notice: Subject to any disclaimer, the term of this patent is extended or adjusted under 35 U.S.C. 154(b) by 295 days.

(21) Appl. No.: 17/743,122

(22) Filed: May 12, 2022

(65) Prior Publication Data

US 2022/0368244 A1 Nov. 17, 2022

Related U.S. Application Data (60) Provisional application No. 63/188,188, filed on May 13, 2021.

(51) Int. Cl.
*H02M 7/217* (2006.01)
*H02M 1/00* (2007.01)
*H02M 1/12* (2006.01)

(52) U.S. Cl.
CPC ......... *H02M 7/217* (2013.01); *H02M 1/0003* (2021.05); *H02M 1/12* (2013.01)

(58) Field of Classification Search
CPC .......... H02M 1/12; H02M 7/219; H02M 1/44; H02M 7/217; H02M 1/0025; H02M 1/126; H02M 1/123; H02M 7/155; H02M 7/125; H02M 1/0016; H02M 1/0019; H02M 1/007

See application file for complete search history.

(56) References Cited

U.S. PATENT DOCUMENTS

| 4,554,517 A | * | 11/1985 | Parniere | ................ | H03C 3/02 |
| | | | | | 331/23 |
| 6,038,152 A | * | 3/2000 | Baker | ................ | H02M 7/219 |
| | | | | | 363/126 |
| 10,622,915 B2 | | 4/2020 | Wang et al. | | |

(Continued)

FOREIGN PATENT DOCUMENTS

| CN | 107154761 B | 12/2019 |
| CN | 110661440 A | 1/2020 |

*Primary Examiner* — Gustavo A Rosario-Benitez
(74) *Attorney, Agent, or Firm* — Suiter Swantz IP (57) ABSTRACT

A device may include an rectifier with one or more transistors that accepts a three-phas7 input and generates a DC bus output, a low-pass filter to provide a filtered DC bus voltage, a driver to drive the transistors based on a modulation index, and a controller to generate the modulation index. The controller may generate a nominal modulation index, generate an adjusted modulation index based on the nominal modulation index modified by a ratio of the filtered and measured DC bus voltages, and provide the modulation index to the PWM driver, where the modulation index is the nominal modulation index when a difference voltage associated with a difference between the filtered and measured DC bus voltages is below a voltage threshold, and where the modulation index is the adjusted modulation index when the difference voltage is above the voltage threshold.

20 Claims, 8 Drawing Sheets

(56) References Cited

U.S. PATENT DOCUMENTS

| | | | |
|---|---|---|---|
| 2007/0200607 A1* | 8/2007 | Ohshima | H02M 7/219 |
| | | | 327/256 |
| 2007/0216343 A1* | 9/2007 | Rozman | H02P 21/06 |
| | | | 318/811 |
| 2012/0326515 A1* | 12/2012 | Murai | H02J 50/12 |
| | | | 307/72 |
| 2013/0155736 A1* | 6/2013 | Ilic | H02M 7/72 |
| | | | 363/71 |
| 2016/0072395 A1* | 3/2016 | Deboy | H02M 7/49 |
| | | | 363/21.1 |
| 2020/0044558 A1* | 2/2020 | Rozman | H02M 3/1582 |
| 2022/0181999 A1* | 6/2022 | Orfanoudakis | H02P 21/13 |
| 2023/0223860 A1* | 7/2023 | Everts | H02J 7/02 |
| | | | 363/125 |
| 2023/0238876 A1* | 7/2023 | Zhang | H02M 3/158 |
| | | | 318/504 |

* cited by examiner

INTELLIGENT RECTIFIER CURRENT REGULATION OF DC BUS VOLTAGE DROOP

CROSS-REFERENCE TO RELATED APPLICATION

The present application claims the benefit under 35 U.S.C. § 119(e) of U.S. Provisional Application Ser. No. 63/188,188, filed May 13, 2021 entitled INTELLIGENT RECTIFIER CURRENT REGULATION OF DC BUS VOLTAGE DROOP, naming Matthew Elswick, Xian Chen, and Kaiyu Wang as inventors, which is incorporated herein by reference in the entirety.

TECHNICAL FIELD

The present disclosure relates generally to the field of active rectifiers and, more particularly, to current regulation of active rectifiers in the presence of DC voltage droop.

BACKGROUND

In the field of electrical devices, a rectifier converts alternating current (AC) to direct current (DC) provided as a DC bus output, which may then drive one or more DC loads. A passive rectifier typically utilizes one or more diodes as one-directional current devices to implement rectification. However, the forward voltage drop across a diode may lower the achievable voltage associated with DC outputs and may further result in unwanted power dissipation in the rectifier. Active rectifiers seek to overcome this problem by utilizing switchable transistors that have substantially smaller voltage drop, where the switching of the transistors and thus the current draw from the AC sources is controlled through a controller such as, but not limited to, a PWM controller.

A typical active rectifier regulates input current from AC sources by adjusting its voltage in relation to an input AC utility voltage on an input side of the rectifier. Because the voltage magnitude created by the active rectifier is proportional to the DC bus voltage, the ideal case for the controller exists when the DC bus is constant. In many practical applications, the DC bus voltage may be affected by various factors including, but not limited to, a load step on the DC side, a voltage droop on the DC side, or the AC utility voltage, which results in non-ideal conditions for the controller. The controller should modify a PWM index in response to a DC bus voltage change to compensate for the change. However, typical controllers may suffer from inadequate response times to such DC bus changes, which may result in input currents rising above current limits and/or undesirable harmonics in the input currents. There is therefore a need to develop systems and methods for stable active rectification control in the presence of DC bus variations.

SUMMARY

A device is disclosed in accordance with one or more illustrative embodiments of the present disclosure. In one illustrative embodiment, the device includes a rectifier with one or more transistors, where the rectifier accepts a three-phase alternating-current (AC) input and generates a direct-current (DC) bus. In another illustrative embodiment, the device includes a low-pass filter to apply a low-pass filter to a DC bus voltage of the DC bus and provide a filtered DC bus voltage. In another illustrative embodiment, the device includes a driver to drive the one or more transistors of the rectifier based at least in part on a first modulation index to generate the DC bus from the AC input. In another illustrative embodiment, the device includes a controller to generate the first modulation index. In another illustrative embodiment, the controller generates a second modulation index. In another illustrative embodiment, the controller compares the filtered DC bus voltage with the DC bus voltage to generate a difference voltage. In another illustrative embodiment, the controller generates a third modulation index, where the third modulation index corresponds to the second modulation index multiplied by a ratio of the filtered DC bus voltage to the DC bus voltage. In another illustrative embodiment, the controller provides the first modulation index to the driver, where the first modulation index is the second modulation index when the difference voltage is equal to or below a threshold, and where the first modulation index is the third modulation index when the difference voltage is above or equal to the threshold.

A device is disclosed in accordance with one or more illustrative embodiments of the present disclosure. In one illustrative embodiment, the device includes a rectifier with one or more transistors, where the rectifier accepts a three-phase alternating-current (AC) input and generates a direct-current (DC) bus. In another illustrative embodiment, the device includes a low-pass filter to apply a low-pass filter to a DC bus voltage of the DC bus and provide a filtered DC bus voltage. In another illustrative embodiment, the device includes a driver to drive the one or more transistors of the rectifier based at least in part on a first modulation index to generate the DC bus from the AC input. In another illustrative embodiment, the device includes a controller. In another illustrative embodiment, the controller generates a second modulation index. In another illustrative embodiment, the controller generates the first modulation index by multiplying the second modulation index by a ratio of the filtered DC bus voltage to the DC bus voltage. In another illustrative embodiment, the controller provides the first modulation index to the PWM driver.

A method is disclosed in accordance with one or more illustrative embodiments of the present disclosure. In one illustrative embodiment, the method includes generating a direct-current (DC) bus from a three-phase alternating-current (AC) input with a rectifier including one or more transistors. In another illustrative embodiment, the method includes generating a filtered DC bus voltage using a low-pass filter. In another illustrative embodiment, the method includes generating a first modulation index. In another illustrative embodiment, the method includes comparing filtered DC bus voltage with the DC bus voltage to generate a difference voltage. In another illustrative embodiment, the method includes generating a second modulation index, wherein the second modulation index corresponds to the first modulation index multiplied by a ratio of the filtered DC bus voltage to the DC bus voltage. In another illustrative embodiment, the method includes providing a third modulation index to a driver, where the third modulation index is the first modulation index when the difference voltage is equal to or below a threshold, and where the third modulation index is the second modulation index when the difference voltage is above or equal to the threshold. In another illustrative embodiment, the method includes providing drive signals to the one or more transistors based on the third modulation index to the rectifier for the generation of the DC bus.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF DRAWINGS

The numerous advantages of the disclosure may be better understood by those skilled in the art by reference to the accompanying figures.

DETAILED DESCRIPTION

Reference will now be made in detail to the subject matter disclosed, which is illustrated in the accompanying drawings. The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Embodiments of the present disclosure are directed to systems and methods for stable active rectification of a three-phase alternating-current (AC) input in the presence of fluctuations of a direct-current (DC) bus voltage. In some embodiments, an active rectification device includes an active rectifier with switchable transistors and a control system for selectively switching the switchable transistors to convert the AC input to the DC output. For example, the control system may include a pulse width modulation (PWM) driver to control the operational state of the switchable transistors through PWM drive signals and a PWM controller to regulate the PWM drive signals based on feedback and/or feedforward inputs.

It is contemplated herein that one function of the PWM controller may be to regulate the input currents associated with the phases of the AC input signal. The active rectifier may generally regulate input currents by adjusting its voltage relative to the voltages associated with the phases of the AC input signal (e.g., the utility voltages). Further, the magnitude of the voltage of the active rectifier may be proportional to a DC bus voltage on the DC side. In practical applications, the DC bus voltage is not constant and may be impacted by both load conditions and utility voltage variations, resulting in dips, droops, steps, or the like. As a result, fluctuations of the DC bus voltage may impact the input currents into the active rectifier, resulting in negative performance impacts.

In some embodiments, the PWM controller defines or otherwise controls a modulation index and the PWM driver generates the PWM drive signals based on the modulation index. As an illustration, PWM drive signals may be generated based on a carrier signal with a carrier frequency that is modulated by a modulation signal with a modulation frequency lower than the carrier frequency. For instance, a PWM drive signal may be generated by multiplying a carrier signal having any suitable form (e.g., triangle wave, or the like) by a modulation signal (e.g., a sinusoidal wave, or the like). In this illustration, the modulation index may be a ratio of an amplitude of the modulation signal to an amplitude of the carrier signal. The modulation index may thus impact the durations for which various switchable transistors are turned "on" (e.g., operated in a conducting state) as they are modulated at the carrier frequency. It is contemplated herein that adjustments to the modulation index may thus impact various aspects of the performance of the PWM control loop including, but not limited to, the input current.

It is further contemplated herein that such fluctuations of the DC bus voltage represent non-ideal conditions for input current control and that not all PWM controller designs provide adequate compensation for these fluctuations. A PWM controller may employ various techniques to compensate for DC bus voltage variations including, but not limited to, adjusting the modulation index associated with the PWM drive signals. However, typical PWM controllers may fail to provide adequate response times, result in excessive current spikes, or introduce harmonics into the input currents that may result in a reduced power factor or other performance metrics.

In some embodiments, a modulation index associated with PWM drive signals for an active rectifier is adjusted based on a ratio of a low-pass filtered version of a DC bus voltage from the active rectifier to a measured DC bus voltage. In this way, the amount of adjustment relative to a nominal modulation index may scale with the magnitude of the fluctuation. For the purposes of the present disclosure, the term nominal is used to refer to an input value. For instance, a nominal modulation index (e.g., a nominal value of the modulation index) may correspond to a design value associated with expected operational conditions. A nominal value may further be referred to more generally simply as a value (e.g., a first value, a second value, or the like).

An active rectification device may conditionally adjust a PWM modulation index to compensate for fluctuations in a DC bias voltage. For example, the active rectification device may include an active rectifier with one or more switching transistors that accepts a three-phase AC input and generates a DC bus output, a low-pass filter to provide a filtered DC bus voltage, a PWM driver to drive the transistors based on a PWM modulation index, and a PWM controller to generate the PWM modulation index. The PWM controller may generate a nominal modulation index based on the DC bus voltage, which may be, but is not required to be, based on an assumption of a stable DC bus voltage. The PWM controller may also compare the filtered DC bus voltage to a measurement of the DC bus voltage to generate a difference voltage. The PWM controller may also generate an adjusted modulation index based on a ratio of the filtered and measured DC bus voltages. The PWM controller may also provide the modulation index to the PWM driver, where the modulation index is the nominal modulation index when the difference voltage is below a voltage threshold, and where the modulation index is the adjusted modulation index when the difference voltage is above the voltage threshold.

In some embodiments, conditional logic is used to adjust the modulation index from a nominal modulation index only when a difference between the measured DC bus voltage and the low-pass-filtered DC bus voltage exceeds a threshold (e.g., a voltage threshold). It is contemplated herein that adjusting the modulation index only when such a threshold is exceeded may facilitate highly-stable operation with adjustments to the modulation index limited to the duration of significant fluctuations and may particularly mitigate undesirable harmonics in the input currents to the active rectifier.

Referring now generally to FIGS. 1-7, systems and methods for active rectification in the present of DC bus fluctuations are described in greater detail in accordance with one or more embodiments of the present disclosure.

Figure 1:
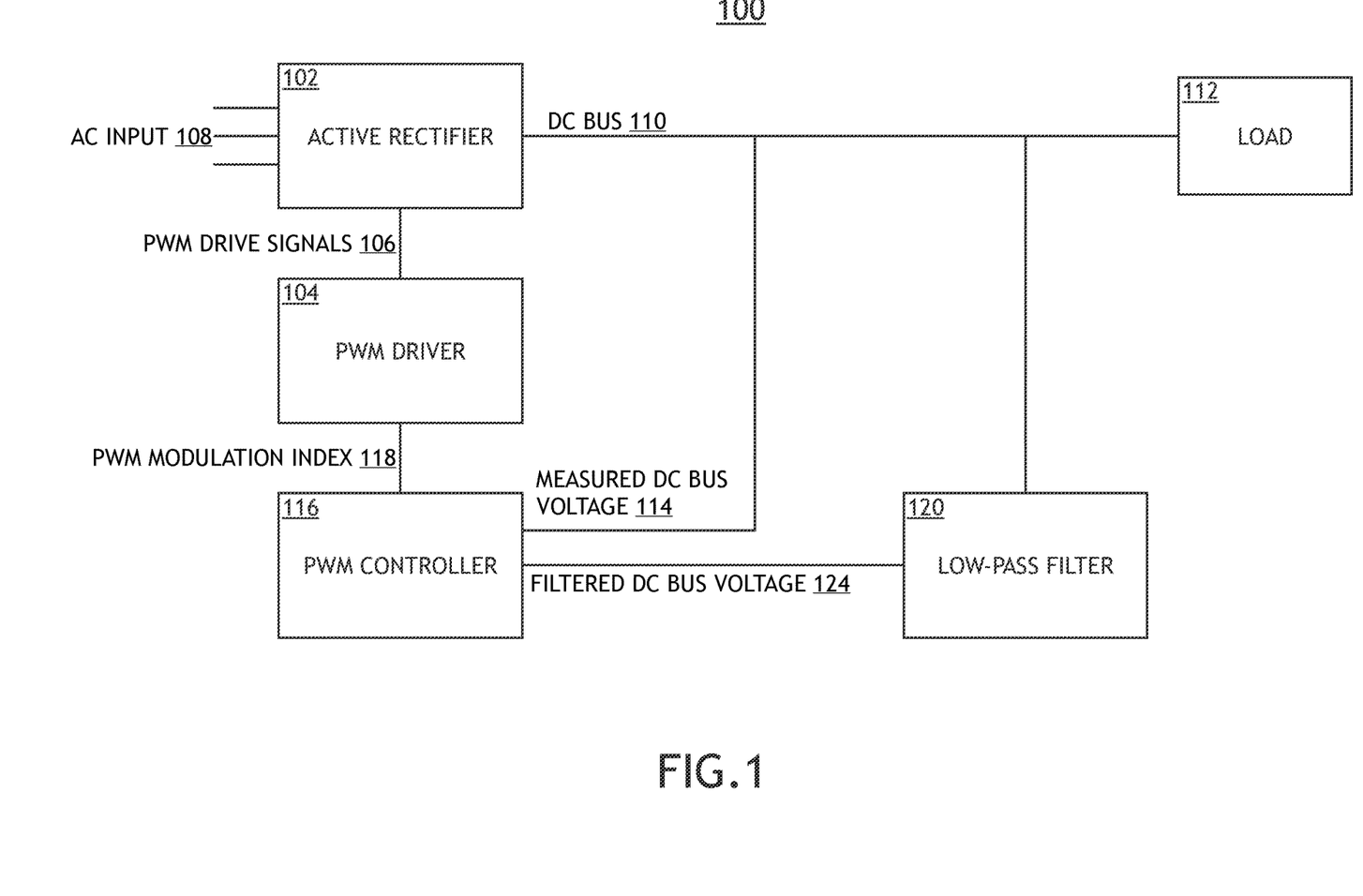
FIG. 1 is a diagrammatic view of an active rectification device in accordance with one or more embodiments of the present disclosure.
Figure 2:
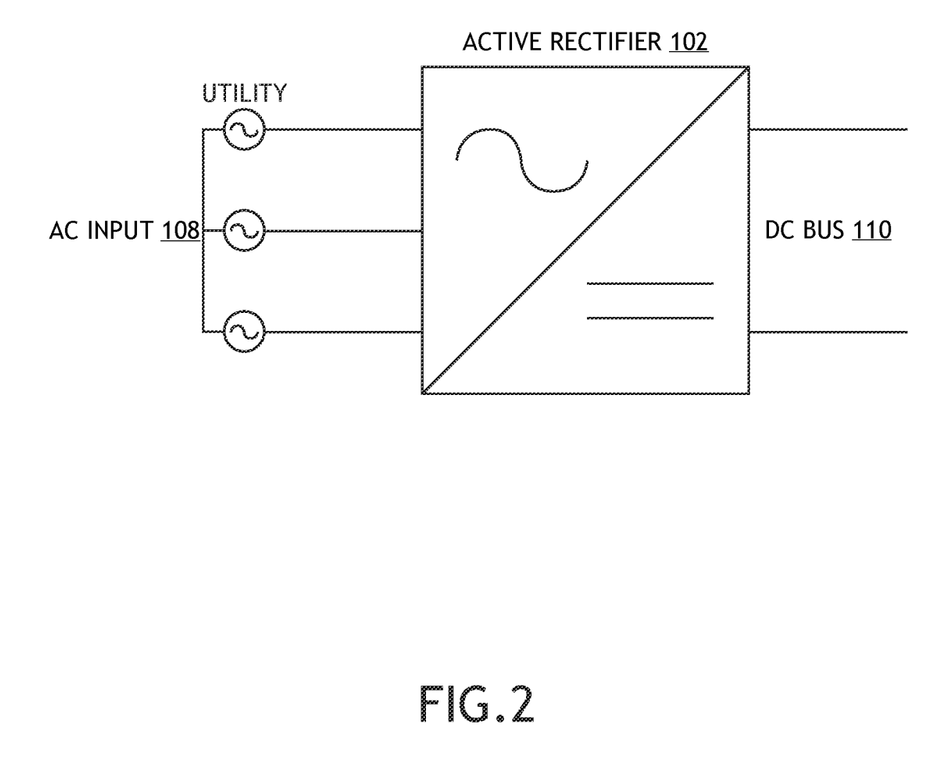
FIG. 2 is a diagrammatic view of an active rectifier in accordance with one or more embodiments of the present disclosure.

FIG. 1 is a diagrammatic view of an active rectification device 100 in accordance with one or more embodiments of the present disclosure. FIG. 2 is a diagrammatic view of an active rectifier 102 in accordance with one or more embodiments of the present disclosure.

In some embodiments, an active rectification device 100 includes an active rectifier 102 including switching transistors and a pulse-width modulation (PWM) driver 104 to generate PWM drive signals 106 to control the operation of the switching transistors to convert the three-phase AC input 108 to a DC bus 110 output suitable for powering one or more loads 112. For example, the PWM driver 104 may generate the PWM drive signals 106 based at least in part from a measured DC bus voltage 114 (e.g., a measured value of a voltage of the DC bus 110) provided to a PWM controller 116.

It is to be understood that the use of the term active with respect to an element herein is solely for illustrative purposes to indicate operation based on control signals (e.g., PWM control signals, or the like), but should not be interpreted as limiting on the present disclosure. For example, the active rectification device 100 may be simply referred to as a rectification device, a rectifier, or a device. As another example, the active rectifier 102 may also be simply referred to as a rectifier 102. It is further to be understood that the use of the term switching transistor herein is solely for illustrative purposes to describe a transistor that may be operated as a switch within a rectifier 102. Such a switching transistor may be simply referred to as a transistor.

The active rectifier 102 may be any active rectifier circuit known in the art suitable for generating a DC bus 110 from a three-phase AC input 108. For example, the active rectifier 102 may include a pair of switching transistors for each phase of the AC input 108 that may be alternately switched on and off to convert the AC input 108 to DC on the DC bus 110. The active rectifier 102 may also include various components to facilitate a smooth voltage value of the DC bus 110 and load control such as inductors for the AC phases, a capacitor across the DC bus 110, or the like. The active rectifier 102 may further include any type of switching transistors known in the art such as, but not limited to, metal-oxide-semiconductor field-effect transistors (MOSFETs), insulated gate bipolar transistors (IGBTs), or gate turn-off thyristors (GTOs).

The active rectification device 100 may further include a PWM controller 116 to provide control inputs such as, but not limited to, a PWM modulation index 118 to the PWM driver 104 to enable dynamic control of the active rectifier 102. For example, the PWM modulation index 118 may correspond to a ratio of an amplitude of a modulation signal to an amplitude of a carrier signal. Accordingly, the PWM controller 116 may provide a value of the PWM modulation index 118 (e.g., either as a digital or analog value) to the PWM driver 104, where the PWM driver 104 generates the modulation signal and the carrier signal with amplitudes based on the received value of the PWM modulation index 118. The PWM driver 104 may then output at least one PWM drive signal 106 corresponding to the carrier signal modulated by the modulation signal in accordance with the received PWM modulation index 118.

In this way, various PWM schemes may be implemented to customize, optimize, or otherwise control various operational properties of the active rectifier 102. Further, the PWM controller 116 and the PWM driver 104 may be integrated within feedback and/or feedforward loops to provide control of the active rectifier based on the output of the DC bus 110 and/or other external control or prediction signals. For example, FIG. 1 illustrates the PWM controller 116 and PWM driver 104 integrated within a feedback loop based on various inputs including, but not limited to, a measured DC bus voltage 114.

The PWM controller 116 and the PWM driver 104 may include any combination of hardware or software components suitable for generating PWM drive signals 106 suitable for controlling the switchable transistors of the active rectifier 102 and for controlling various aspects of the PWM drive signals 106 to provide desired performance. Further, although depicted as separate elements in FIG. 1, the PWM controller 116 and the PWM driver 104 may be formed as a single integrated package or may be formed as any number of hardware or software elements known in the art suitable for providing PWM control of the active rectifier 102.

In some embodiments, the PWM driver 104 and/or the PWM controller 116 include a memory device to store program instructions associated with any of the steps disclosed herein and one or more processors to execute the program instructions. For the purposes of the present disclosure, the term "processor" may be broadly defined to encompass any device having one or more processing or logic elements (e.g., one or more micro-processors, one or more microcontrollers, one or more application specific integrated circuit (ASIC) devices, one or more field programmable gate arrays (FPGAs), or one or more digital signal processors (DSPs)). In this sense, the one or more processors may include any device configured to execute algorithms and/or instructions (e.g., program instructions stored in the memory). Further, the memory device may include any storage medium known in the art suitable for storing program instructions executable by the associated one or more processors. For example, the memory device may include a non-transitory memory medium. By way of another example, the memory device may include, but is not limited to, a read-only memory (ROM), a random-access memory (RAM), a magnetic or optical memory device (e.g., disk), a magnetic tape, a solid-state drive, or the like. In some embodiments, the PWM driver 104 and/or the PWM controller 116 includes one or more analog elements such as, but not limited to, resistors, capacitors, inductors, transistors, operational amplifiers (OP-AMPs), or logic gates.

One function of the PWM controller 116 may be to regulate and stabilize the input currents associated with the phases of the AC input 108. A PWM controller 116 may include any number of feedback or feedforward control loops to provide control of the input currents. For example, a PWM controller 116 for an active rectifier 102 may include a DC bus voltage control loop utilizing a measured DC bus voltage 114 as feedback and may further include a current control loop utilizing the measured DC bus voltage 114 as a feedforward term. Additionally, while an active rectifier 102 may generally be used to drive any type of load, it is common to drive a constant power load that has a negative impedance. These factors may render current control in the presence of fluctuations of the voltage of the DC bus 110 difficult.

In some embodiments, the PWM controller 116 regulates, adjusts, or otherwise controls a value of the PWM modulation index 118 associated with PWM drive signals 106 to compensate for fluctuations of the voltage of the DC bus 110, which may impact the input currents as described previously herein. For example, a PWM controller 116 may calculate or otherwise generate a nominal PWM modulation index (referred to herein also as an input PWM modulation index), which may be generated using any technique known in the art. For example, the nominal PWM modulation index may correspond to a fixed value, which may be determined by any means known in the art including, but not limited to, design parameters of the active rectification device 100 or any component therein (e.g., an active rectifier 102). As another example, the nominal PWM modulation index may be generated based on one or more control loops (e.g., feedback or feedforward control loops) based at least in part on a measurement of the DC bus 110 (e.g., a measured DC bus voltage 114).

The PWM controller 116 may then adjust the nominal PWM modulation index based on measured variations of the DC bus 110 (e.g., the measured DC bus voltage 114). For example, the PWM controller 116 may adjust the nominal PWM modulation index based on the measured DC bus voltage 114 and a nominal DC bus voltage, where the nominal DC bus voltage may correspond to a value of the DC bus voltage based on a design of the active rectification device 100 under typical operational conditions. For example, one technique for adjusting the modulation index is provided by equation (1):

$$\text{Adjusted } PWM \text{ modulation index} = \text{Input } PWM \text{ modulation index} \cdot \frac{\text{Nominal } DC \text{ bus}}{\text{Measured } DC \text{ bus}}. \quad (1)$$

which adjusts an input PWM modulation index value based on a ratio of the nominal DC bus voltage value and a measured DC bus voltage value.

Figure 3:
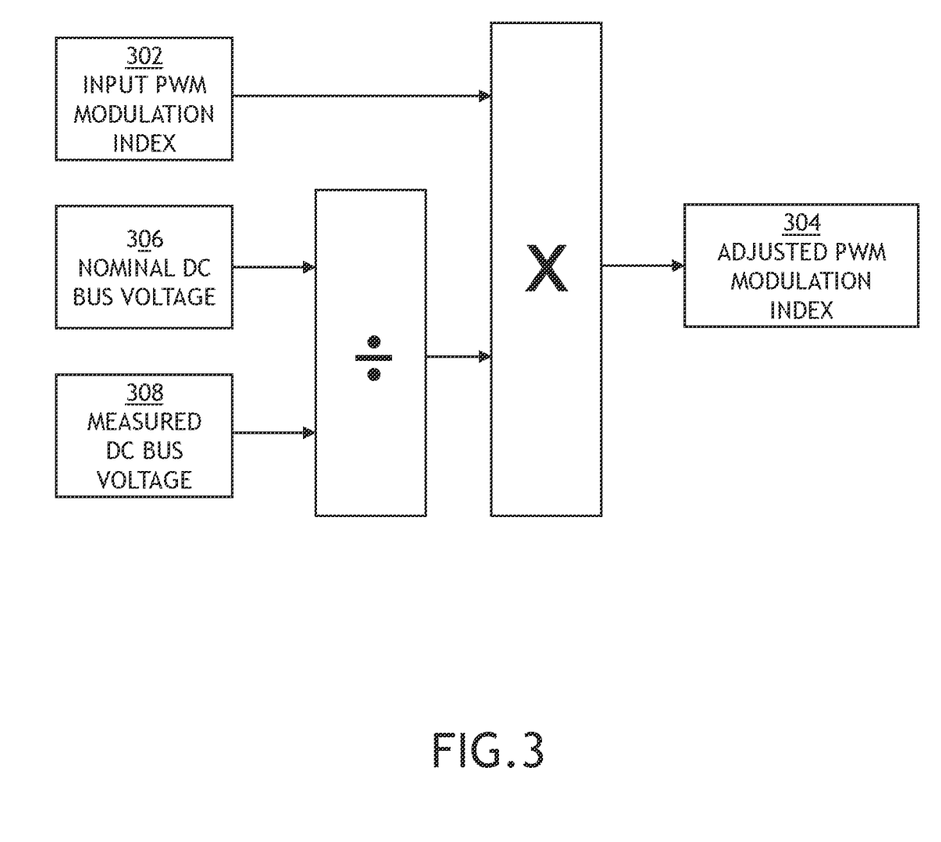
FIG. 3 is a schematic flow diagram for active rectification based on a nominal DC bus, in accordance with one or more embodiments of the present disclosure.

FIG. 3 is a schematic flow diagram for active rectification based on a nominal DC bus, in accordance with one or more embodiments of the present disclosure. For example, FIG. 3 may correspond to an implementation of equation (1). In accordance with equation (1) and FIG. 3, an input PWM modulation index 302 (e.g., a nominal PWM modulation index as described previously herein) may be generated using a PWM controller using techniques known in the art. For example, the input PWM modulation index 302 may have a fixed value (e.g., a fixed design value). As another example, the input PWM modulation index may be generated using one or more feedback or feedforward control loops such as, but not limited to, a voltage control loop or a current control loop. Further the input PWM modulation index may utilize any combination of inputs including, but not limited to, currents and/or voltages of the DC bus 110 or the AC input 108.

As provided in FIG. 3, this input PWM modulation index 302 may then be adjusted (e.g., to generate an adjusted PWM modulation index 304) based on a ratio of a nominal DC bus voltage value 306 (e.g., a design value, an expected value, or the like) to a measured DC bus voltage value 308.

Figure 4:
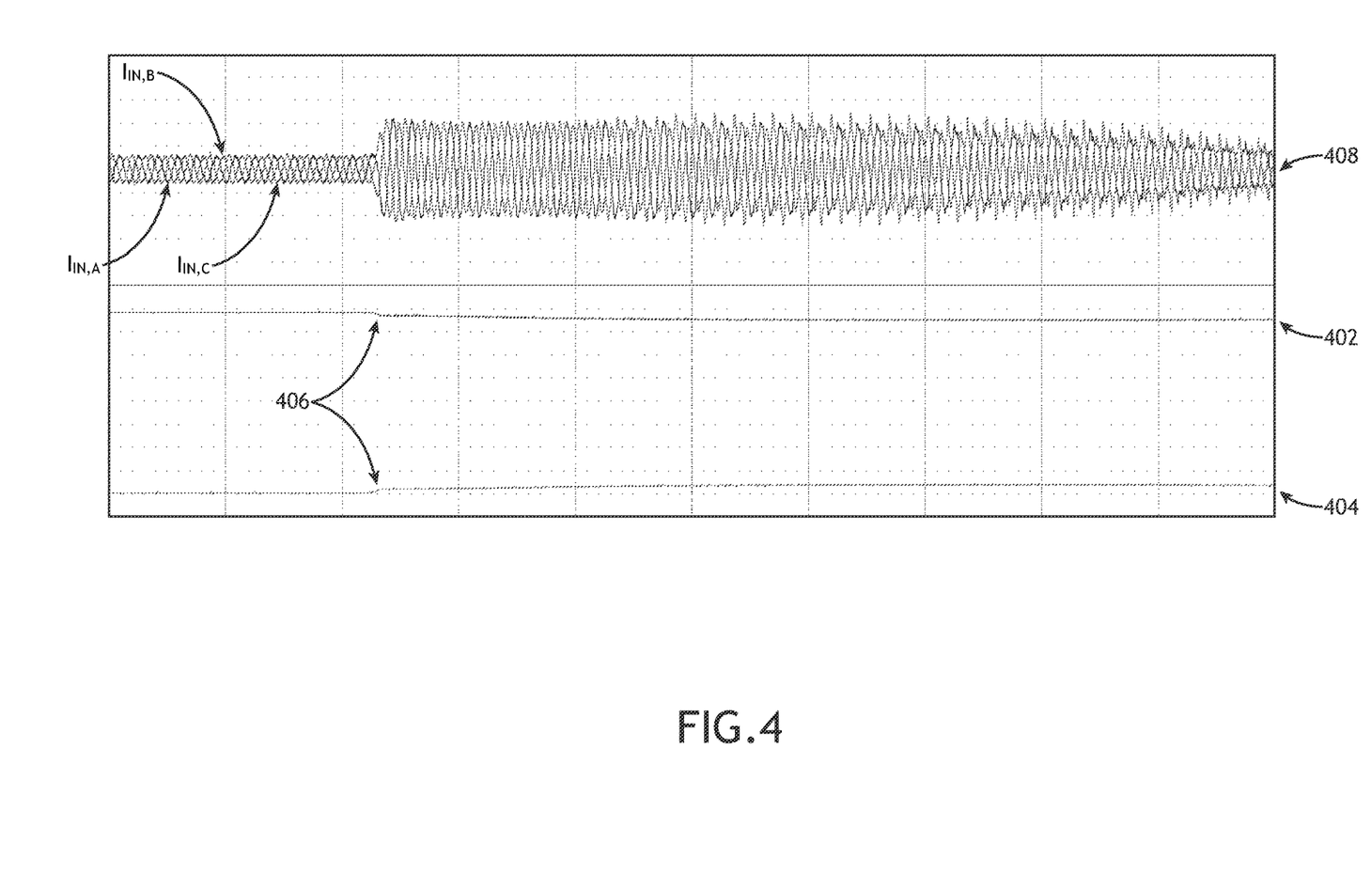
FIG. 4 is a plot illustrating experimental results of controlling the modulation index based on a DC bus voltage measurement and a nominal DC bus voltage using the flow diagram of FIG. 3, in accordance with one or more embodiments of the present disclosure.

However, it is contemplated herein that merely controlling or adjusting the nominal modulation index based on a DC bus voltage measurement and a nominal DC bus voltage value may induce instabilities and/or harmonics in the input currents. FIG. 4 is a plot illustrating experimental results of controlling the modulation index based on a DC bus voltage measurement and a nominal DC bus voltage using equation (1) and the flow diagram of FIG. 3, in accordance with one or more embodiments of the present disclosure.

In particular, FIG. 4 illustrates a positive DC bus voltage 402 and a negative DC bus voltage 404 (e.g., corresponding to a measured DC bus voltage 308 in FIG. 3) over time, where the positive DC bus voltage 402 and negative DC bus voltage 404 include a voltage step 406. Further, the positive DC bus voltage 402 and a negative DC bus voltage are referenced to a midpoint (not explicitly shown). FIG. 4 further illustrates the AC input currents 408 (e.g., $I_{In,A}$, $I_{In,B}$, and $I_{In,C}$) associated with the three phases of the AC input 108 in response. As shown in FIG. 4, adjusting an input PWM modulation index 302 based on a ratio of the nominal DC bus voltage value 306 and a measured DC bus voltage value 308 may result in both substantially increased values of the input currents 408 as well as substantial harmonics in the input currents 408. Additionally, although the input currents 408 appear to trend towards settling back to the values prior to the voltage step 406, this settling may occur over an unacceptably long time period.

Referring again to FIG. 1, in some embodiments, the active rectification device 100 includes a low-pass filter 120 (LPF) coupled to the DC bus 110 to provide a filtered DC bus voltage 124, which may be provided to the PWM controller 116 in addition to a measured DC bus voltage 114. The low-pass filter 120 may be formed as any type of low-pass filter known in the art. Further, various aspects of the low-pass filter 120 such as, but not limited to, a cutoff voltage or a time constant may be either fixed or adjustable (e.g., by firmware or other adjustments in the field).

Figure 5:
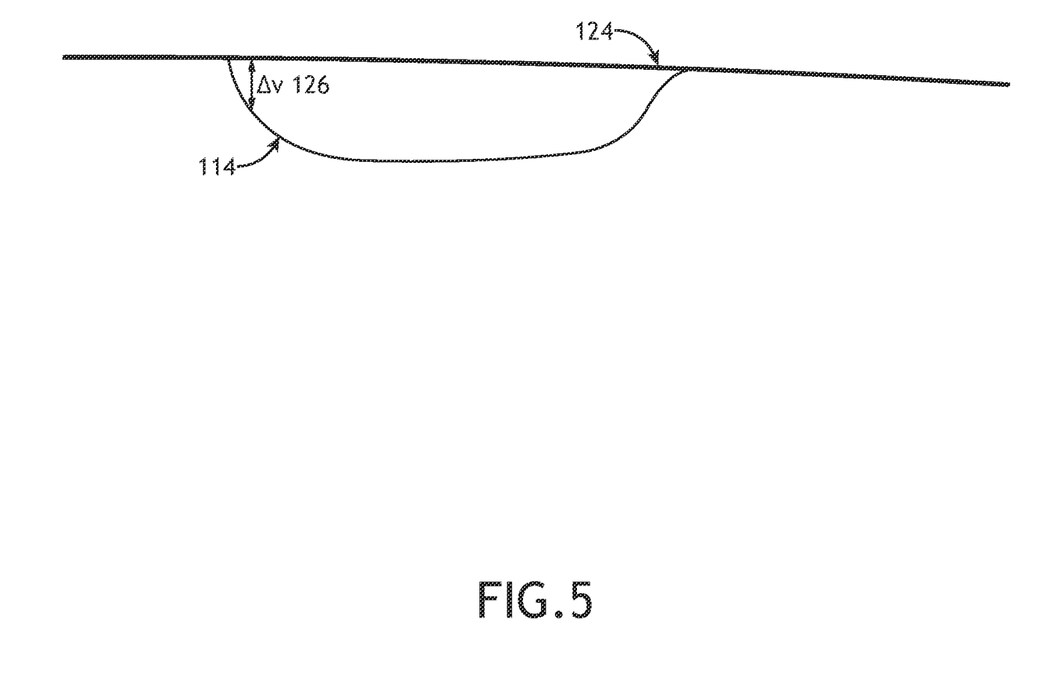
FIG. 5 is an example of a measured DC bus voltage and a filtered DC bus voltage from a low-pass filter illustrating a load-induced difference voltage (ΔV) between the two signals, in accordance with one or more embodiments of the present disclosure.

FIG. 5 is an example of a measured DC bus voltage 114 and a filtered DC bus voltage 124 from the low-pass filter 120 illustrating a load-induced difference voltage 126 (ΔV) between the two signals, in accordance with one or more embodiments of the present disclosure.

In some embodiments, the PWM controller 116 calculates or otherwise generates the PWM modulation index 118 based on the measured DC bus voltage 114 and the filtered DC bus voltage 124 from the low-pass filter 120. For example, the PWM controller 116 generate an input PWM modulation index using any technique known in the art as described previously herein (e.g., with respect to FIG. 3). The PWM controller 116 may further modify the input PWM modulation index based on a ratio of the filtered DC bus voltage 124 and the measured DC bus voltage 114 as provided in equation (2) to generate an adjusted PWM modulation index:

$$\text{Adjusted } PWM \text{ modulation index} = \text{Input } PWM \text{ modulation index} \cdot \frac{\text{Filtered } DC \text{ bus}}{\text{Measured } DC \text{ bus}}. \quad (2)$$

This adjusted PWM modulation index may then be provided to the PWM driver 104 as the PWM modulation index 118.

It is contemplated herein that a difference voltage 126 (ΔV) between the DC bus voltage 114 and the filtered DC bus voltage signal 124 is typically small. However, in the case that the DC bus voltage 114 experiences a fluctuation (e.g., a voltage dip, a voltage droop, a step, or the like), the difference voltage 126 will increase and the calculated PWM modulation index may be scaled by the ratio of the filtered DC bus voltage signal 124 to the DC bus voltage 114 as described in equation (2).

Figure 6:
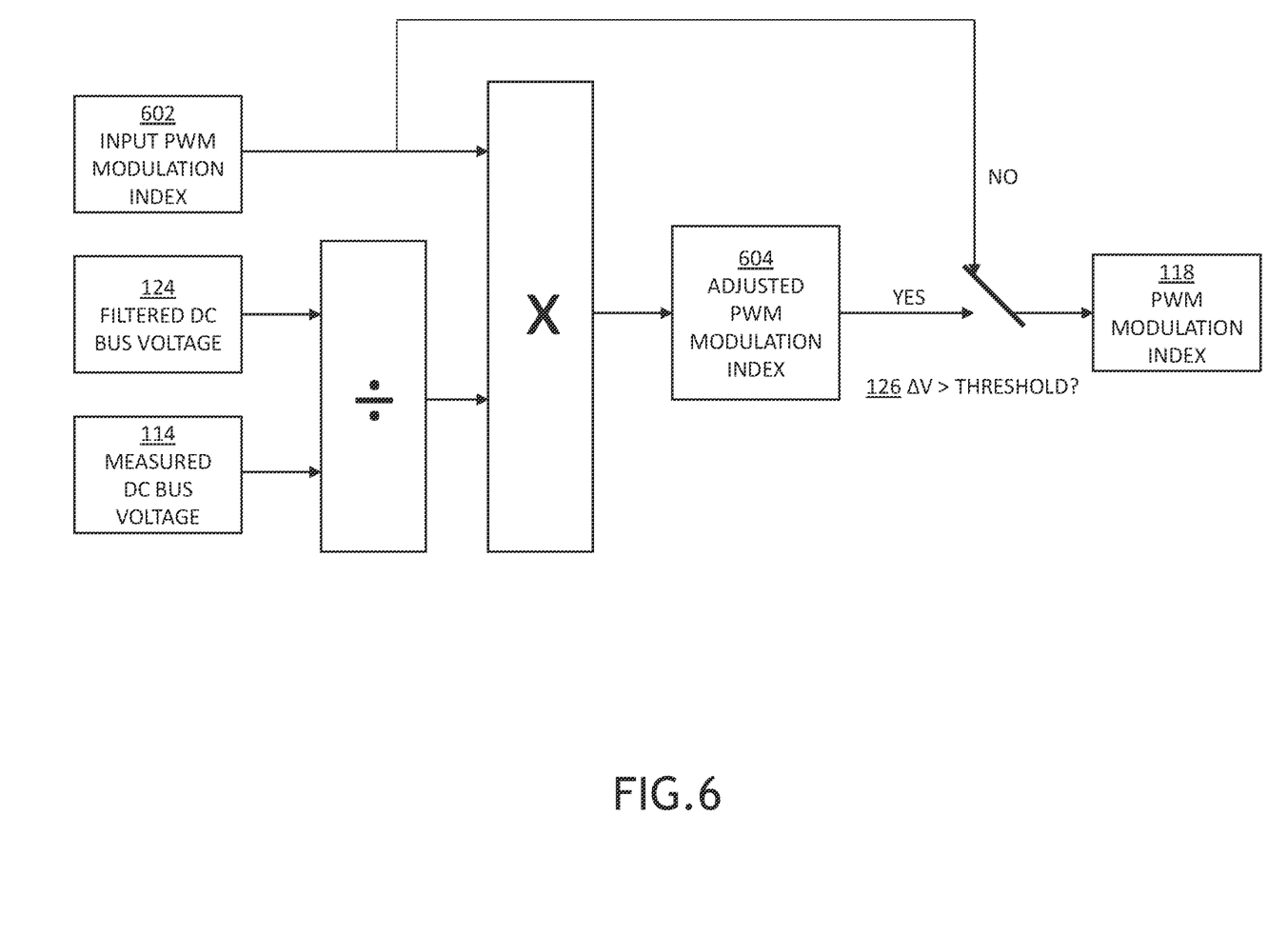
FIG. 6 is a schematic flow diagram providing conditional PWM modulation index adjustments based on a voltage threshold, in accordance with one or more embodiments of the present disclosure.

In some embodiments, the PWM controller 116 includes conditional logic to modify the input PWM modulation index only when the difference voltage 126 exceeds a voltage threshold. FIG. 6 is a schematic flow diagram providing conditional PWM modulation index adjustments based on a voltage threshold, in accordance with one or more embodiments of the present disclosure.

In this configuration, when the difference voltage 126 (ΔV) is below the threshold, the PWM modulation index 118 provided to the PWM driver 104 corresponds to an input PWM modulation index 602, which may be generated using any technique known in the art as described previously herein. Further, when the difference voltage 126 (ΔV) is above or equal to the threshold, the PWM modulation index 118 provided to the PWM driver 104 corresponds to an adjusted PWM modulation index based on the filtered DC bus voltage 124 and the measured DC bus voltage 114. For example, in this case, the PWM modulation index 118 may be provided as the adjustable PWM modulation index 604, which may correspond to the input PWM modulation index modified by a ratio of the filtered DC bus voltage 124 and the measured DC bus voltage 114 as described in equation (2).

The threshold depicted in FIG. 6 may be generated or determined using any technique known in the art. In some embodiments, the threshold is fixed and may be selected based on performance tolerances, design considerations of the active rectification system 100, or any other suitable technique. In some embodiments, the threshold is adjustable in the field prior to or during runtime. In this way, the performance of the active rectification device 100 may be tailored for a particular application or set of performance requirements.

It is contemplated herein that use of conditional logic to adjust the nominal PWM modulation index only when the difference voltage 126 is greater than a threshold (e.g., a voltage threshold) may enable the active rectification device 100 to quickly respond to and compensate for fluctuations in the DC bus voltage 114, while also reducing the timeframe in which the PWM modulation index 118 provided to the PWM driver 104 deviates from the input PWM modulation index (e.g., one generated using design considerations and/or traditional control techniques) in response to the fluctuations. As a result, the active rectification device 100 may avoid undesirable harmonics, input current spikes, or instabilities.

Figure 7:
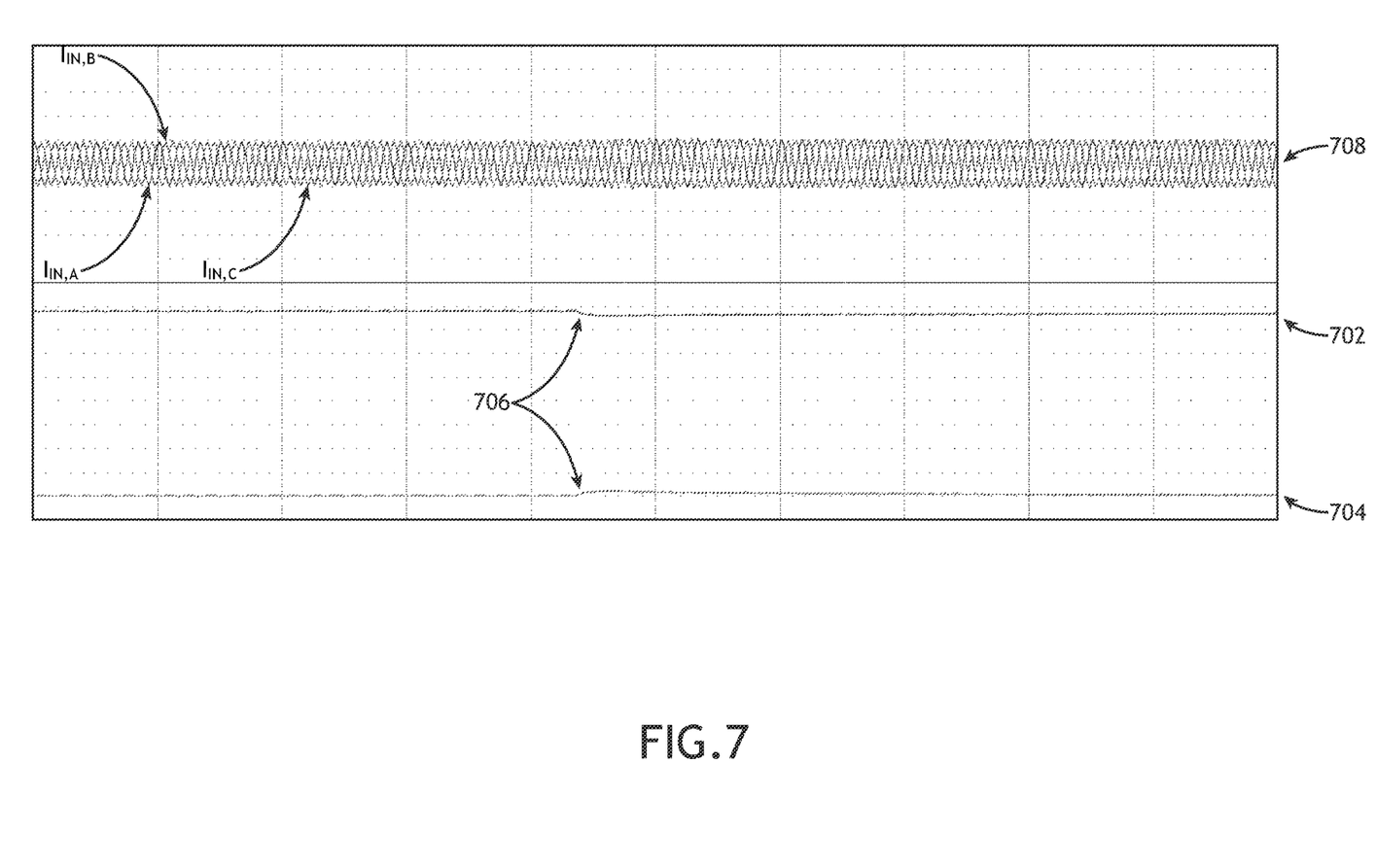
FIG. 7 is a plot illustrating experimental results of controlling the PWM modulation index based on a measurement of the DC bus voltage and the filtered DC bus voltage signal from a low-pass filter using the flow diagram of FIG. 6, in accordance with one or more embodiments of the present disclosure.

FIG. 7 is a plot illustrating experimental results of controlling the PWM modulation index 118 based on a measurement of the DC bus voltage 114 and the filtered DC bus voltage signal 124 from the low-pass filter 120 using equation (2) and the flow diagram of FIG. 6, in accordance with one or more embodiments of the present disclosure.

In particular, FIG. 7 illustrates a positive DC bus voltage 702 and a negative DC bus voltage 704, where the positive DC bus voltage 702 and negative DC bus voltage 704 include a voltage step 706. FIG. 7 further illustrates the AC input currents 708 (e.g., $I_{In,A}$, $I_{In,B}$, and $I_{In,C}$). As shown in FIG. 7, adjusting the nominal PWM modulation index based on a ratio of the filtered DC bus voltage signal 124 to the DC bus voltage 114 only when a difference voltage 126 exceeds a voltage threshold results in stable AC input currents 708 in the presence of the voltage step 706. Contrasted with FIG. 5, the AC input currents 708 exhibit only a slight increase in response to the voltage step 706 without inducing harmonics.

In this way, FIG. 7 illustrates the results of a configuration of the low-pass filter 120 that produces a clear and measurable difference between the measured DC bus voltage 114 and the filtered DC bus voltage signal 124. This configuration substantially eliminates the load-induced difference voltage 126.

Figure 8:
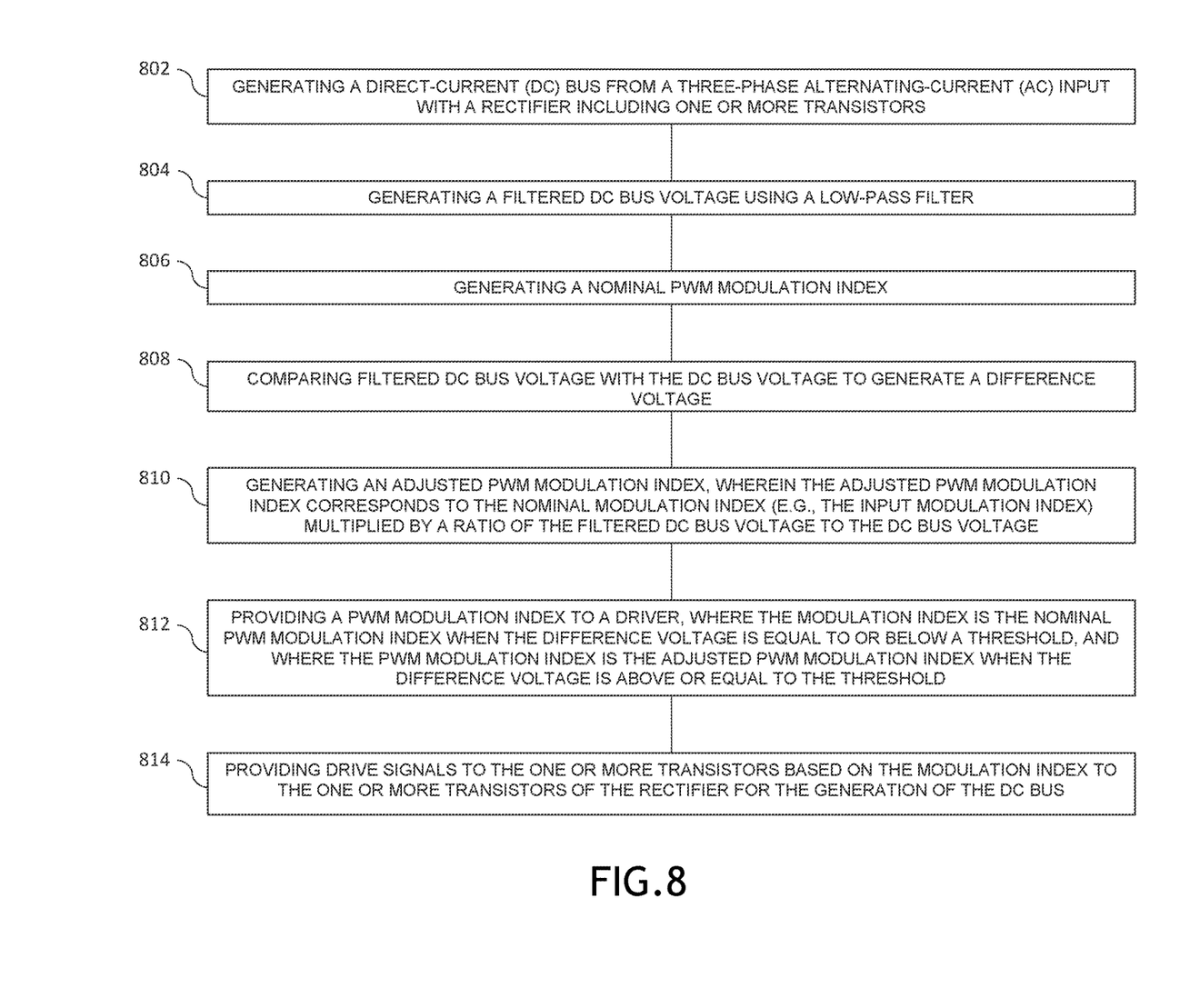
FIG. 8 is a flow diagram illustrating steps performed in a method for active rectification, in accordance with one or more embodiments of the present disclosure.

FIG. 8 is a flow diagram illustrating steps performed in a method 800 for active rectification, in accordance with one or more embodiments of the present disclosure. Applicant notes that the embodiments and enabling technologies described previously herein in the context of the active rectification device 100 should be interpreted to extend to method 800. It is further noted, however, that the method 800 is not limited to the architecture of the active rectification device 100.

In some embodiments, the method 800 includes a step 802 of generating a direct-current (DC) bus from a three-phase alternating-current (AC) input with a rectifier including one or more transistors. In some embodiments, the method 800 includes a step 804 of generating a filtered DC bus voltage using a low-pass filter.

In some embodiments, the method 800 includes a step 806 of generating a nominal PWM modulation index (e.g., an input PWM modulation index). The nominal modulation index may be generated using any technique known in the art. For example, the nominal PWM modulation index may be generated based on design considerations or using one or more feedback and/or feedforward control loops based on any combination of the DC bus or the AC input.

In some embodiments, the method 800 includes a step 808 of comparing filtered DC bus voltage with the DC bus voltage to generate a difference voltage. In some embodiments, the method 800 includes a step 810 of generating an adjusted PWM modulation index, wherein the adjusted PWM modulation index corresponds to the nominal modulation index (e.g., the input modulation index) multiplied by a ratio of the filtered DC bus voltage to the DC bus voltage. In some embodiments, the method 800 includes a step 812 of providing a PWM modulation index to a driver, where the modulation index is the nominal PWM modulation index when the difference voltage is equal to or below a threshold, and where the PWM modulation index is the adjusted PWM modulation index when the difference voltage is above or equal to the threshold. In some embodiments, the method 800 includes a step 814 of providing drive signals to the one or more transistors based on the modulation index to the one or more transistors of the rectifier for the generation of the DC bus.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected" or "coupled" to each other to achieve the desired functionality, and any two components capable of being so associated can also be viewed as being "couplable" to each other to achieve the desired functionality. Specific examples of couplable include but are not limited to physically interactable and/or physically interacting components and/or wirelessly interactable and/or wirelessly interacting components and/or logically interactable and/or logically interacting components.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A device comprising:
   a rectifier including one or more transistors, the rectifier configured to accept a three-phase alternating-current (AC) input and generate a direct-current (DC) bus;
   a low-pass filter to apply low-pass filtering to a DC bus voltage of the DC bus and provide a filtered DC bus voltage;
   a driver to drive the one or more transistors of the rectifier based at least in part on a first modulation index to generate the DC bus from the three-phase AC input; and
   a controller to generate the first modulation index, wherein the controller is configured to:
   generate a second modulation index;
   compare the filtered DC bus voltage with the DC bus voltage to generate a difference voltage;
   generate a third modulation index, wherein the third modulation index corresponds to the second modulation index multiplied by a ratio of the filtered DC bus voltage to the DC bus voltage; and
   provide the first modulation index to the driver, wherein the first modulation index is the second modulation index when the difference voltage is equal to or below a threshold, wherein the first modulation index is the third modulation index when the difference voltage is above or equal to the threshold.

2. The device of claim 1, wherein at least one of a cutoff frequency or a time constant of the low-pass filter is adjustable.

3. The device of claim 1, wherein the threshold is adjustable.

4. The device of claim 1, wherein the second modulation index has a fixed value.

5. The device of claim 1, wherein the controller generates the second modulation index using one or more control loops based on at least one of the AC input or the DC bus.

6. The device of claim 5, wherein the one or more control loops include at least one of a feedback loop or a feedforward loop.

7. The device of claim 1, wherein at least one of the one or more transistors of the rectifier comprises:
   at least one of a metal-oxide-semiconductor field-effect transistor (MOSFET), an insulated gate bipolar transistor (IGBT), or a gate turn-off thyristor (GTO).

8. The device of claim 1, wherein the driver comprises:
   at least one of a micro-processor, a microcontroller, an application specific integrated circuit (ASIC), a field-programmable gate array (FPGA), or a digital signal processor (DSP).

9. A device comprising:
   a rectifier including one or more transistors, the rectifier configured to accept a three-phase alternating-current (AC) input and generate a direct-current (DC) bus;
   a low-pass filter to apply low-pass filtering to a DC bus voltage of the DC bus and provide a filtered DC bus voltage;
   a driver to drive the one or more transistors of the rectifier based at least in part on a first modulation index to generate the DC bus from the three-phase AC input; and
   a controller configured to:
   generate a second modulation index;
   generate the first modulation index by multiplying the second modulation index by a ratio of the filtered DC bus voltage to the DC bus voltage; and
   provide the first modulation index to the driver.

10. The device of claim 9, wherein at least one of a cutoff frequency or a time constant of the low-pass filter is adjustable.

11. The device of claim 9, wherein the second modulation index has a fixed value.

12. The device of claim 9, wherein the controller generates the second modulation index using one or more control loops based on at least one of the AC input or the DC bus.

13. The device of claim 12, wherein the one or more control loops include at least one of a feedback loop or a feedforward loop.

14. The device of claim 9, wherein at least one of the one or more transistors of the rectifier comprises:
   at least one of a metal-oxide-semiconductor field-effect transistor (MOSFET), an insulated gate bipolar transistor (IGBT), or a gate turn-off thyristor (GTO).

15. The device of claim 9, wherein the driver comprises:
   at least one of a micro-processor, a microcontroller, an application specific integrated circuit (ASIC), a field-programmable gate array (FPGA), or a digital signal processor (DSP).

16. A method comprising:
   generating a direct-current (DC) bus from a three-phase alternating-current (AC) input with a rectifier including one or more transistors;
   generating a filtered DC bus voltage using a low-pass filter;
   generating a first modulation index;
   comparing the filtered DC bus voltage with a DC bus voltage to generate a difference voltage;

generating a second modulation index, wherein the second modulation index corresponds to the first modulation index multiplied by a ratio of the filtered DC bus voltage to the DC bus voltage;

providing a third modulation index to a driver, wherein the third modulation index is the first modulation index when the difference voltage is equal to or below a threshold, wherein the third modulation index is the second modulation index when the difference voltage is above or equal to the threshold; and providing drive signals to the one or more transistors based on the third modulation index to the one or more transistors of the rectifier for generation of the DC bus.

17. The method of claim 16, wherein at least one of a cutoff frequency or a time constant of the low-pass filter is adjustable.

18. The method of claim 16, wherein the second modulation index has a fixed value.

19. The method of claim 16, wherein the generating the second modulation index uses one or more control loops based on at least one of the AC input or the DC bus.

20. The method of claim 19, wherein the one or more control loops include at least one of a feedback loop or a feedforward loop.

* * * * *